United States Patent [19]
Ellett

[11] Patent Number: 5,752,690
[45] Date of Patent: May 19, 1998

[54] THREADED COUPLING AND PIG INJECTOR VALVE

[75] Inventor: James Richard Ellett, Edmonton, Canada

[73] Assignee: Argus Machine Co., Ltd., Edmonton, Canada

[21] Appl. No.: 704,131

[22] Filed: Aug. 28, 1996

[51] Int. Cl.$^6$ ........................................... F16K 51/00
[52] U.S. Cl. ................ 251/152; 251/315.1; 251/315.14; 15/104.062; 411/178; 285/92; 285/284.1
[58] Field of Search .............. 285/917, 92, 284.1; 251/315.1, 315.14, 158; 137/15, 268; 411/178; 15/104.062

[56] References Cited

U.S. PATENT DOCUMENTS

| | | | |
|---|---|---|---|
| 3,039,641 | 6/1962 | Rosan | 411/178 X |
| 3,177,513 | 4/1965 | Ellett | 15/104.062 |
| 3,780,986 | 12/1973 | Fujiwara | 251/315.14 |
| 4,226,263 | 10/1980 | Muchow | 251/315.1 X |

FOREIGN PATENT DOCUMENTS 4001799   5/1984   WIPO ........................ 251/315.1

OTHER PUBLICATIONS

Argus Pig Valve, Argus Machine Co. Ltd., product brochure, dated 1994, Edmonton, Canada, 1 page.

Nutron Manufacturing Ltd. Ball Valve Catalogue, Feb., 1987, 7 pages, particularly p. 5, top right side.

W-K-M DynaSeal 310 Ball Valves, Dec., 1993, 44 pages, particularly for example p. 4, bottom.

*Primary Examiner*—Dave W. Arola
*Attorney, Agent, or Firm*—Anthony R. Lambert

[57] ABSTRACT

An improved threaded joint for connecting a first tubular member, for example a valve housing, with an outer end having interior threads with pitch W and terminating in a shoulder. A second tubular member has an exterior threaded end and a flanged end. A shoulder extends outwardly of the second tubular member intermediate the threaded and flanged ends. A flange at the flanged end has N equally circumferentially spaced connectors. One of the first shoulder and second shoulder includes a portion that is elastically deformable over a distance at least equal to W/N so that connectors in the flange may be aligned with connectors in a connecting flange of a pipe line. A side entry cap is disposed in the valve assembly. The side entry cap includes a threaded portion and a sealing portion inward of the threaded portion, the threaded portion being cylindrical and the sealing portion having an exterior surface forming a conical section increasing in diameter outward. The valve assembly has a corresponding conical seat portion for receiving the conical section of the side entry cap in sealing relationship. An annular groove is formed in one of the conical section of the sealing portion and the conical seat portion of the valve assembly, the annular groove being defined by walls extending inward from the respective one of the conical section of the sealing portion and the conical seat portion of the valve assembly. An annular sealing element is disposed within the annular groove.

15 Claims, 3 Drawing Sheets

THREADED COUPLING AND PIG INJECTOR VALVE

FIELD OF THE INVENTION

This invention relates to couplings between tubular members, and in particular to an arrangement for coupling a pipe to a pig valve assembly, and also to an arrangement for sealing a side entry cap of a pigging valve.

BACKGROUND AND SUMMARY OF THE INVENTION

Pig valves typically include a central housing, in which the valve operating elements are contained, and tail pieces at either end. Each tail piece typically includes a flange for connecting to a pipe line, and a flange for connection to the housing. It is difficult to machine the position of the bolt holes in the several flanges so that the bolt holes will all be aligned in the resulting sequence of flanges.

The inventor has recognized this problem, and has proposed a solution in which the flanges connecting the valve housing to the tail pieces are replaced by threaded joints. Further, in order to precisely align the bolt holes, while securing the threaded joint against unwanted motion, abutting shoulders on the threaded joint are made elastically deformable to place a locking pressure on the threaded joint.

There is therefore provided in accordance with one aspect of the invention, an improved threaded joint for connecting a first tubular member, for example a valve housing, one outer end of which has interior threads with a pitch W, and the outer end terminates in a shoulder, and a second tubular member with an exterior threaded end and a flanged end. A shoulder extends outwardly of the second tubular member intermediate the threaded end and flanged end. A flange at the flanged end has N equally circumferentially spaced connectors. One of the first shoulder and second shoulders includes a portion that is elastically deformable over a distance at least equal to W/N so that connectors in the flange may be aligned with connectors in a connecting flange of a pipe line.

There is also provided a further improvement to a pig injector valve, comprising:

a valve assembly having a pair of valve seats;

a valve ball disposed within the valve assembly and seated on the valve seats, the valve ball having a bore;

means to rotate the valve ball within the valve assembly between a position in which the bore is aligned along the pipe and a position in which the bore is aligned across the pipe;

a side entry cap disposed in the valve assembly in alignment with the bore of the valve ball when the bore is aligned across the pipe;

the side entry cap including a threaded portion and a sealing portion inward of the threaded portion, the threaded portion being cylindrical and the sealing portion having an exterior surface forming a conical section increasing in diameter with increasing distance from the bore of the valve ball;

the valve assembly having a corresponding conical seat portion for receiving the conical section of the side entry cap in sealing relationship;

an annular groove formed in one of the conical section of the sealing portion and the conical seat portion of the valve assembly inward of the threaded portion, the annular groove being defined by walls extending inward from the respective one of the conical section of the sealing portion and the conical seat portion of the valve assembly; and an annular sealing element disposed within the annular groove.

These and other aspects of the invention are described in the detailed description and claims that follow.

BRIEF DESCRIPTION OF THE DRAWINGS

There will now be described preferred embodiments of the invention, with reference to the drawing, by way of illustration, in which like numerals denote like elements and in which.

DETAILED DESCRIPTION OF PREFERRED EMBODIMENTS

Figure 2:
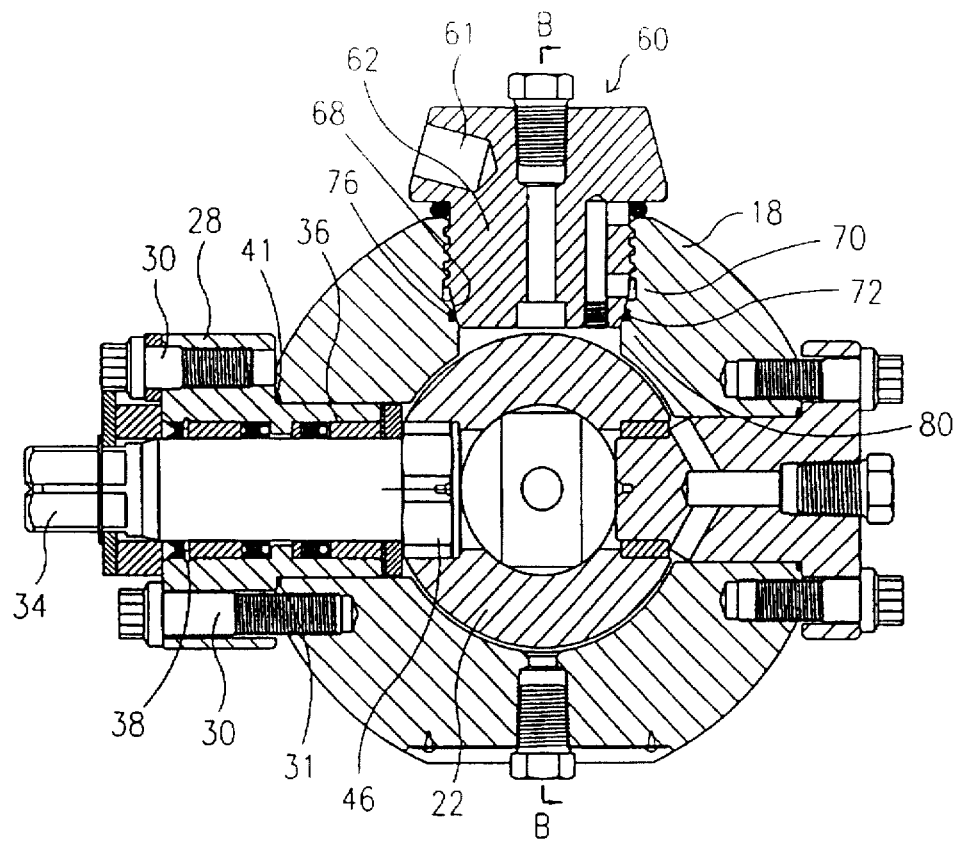
FIG. 2 is a cross section of the pig valve of FIG. 1.
Figure 1:
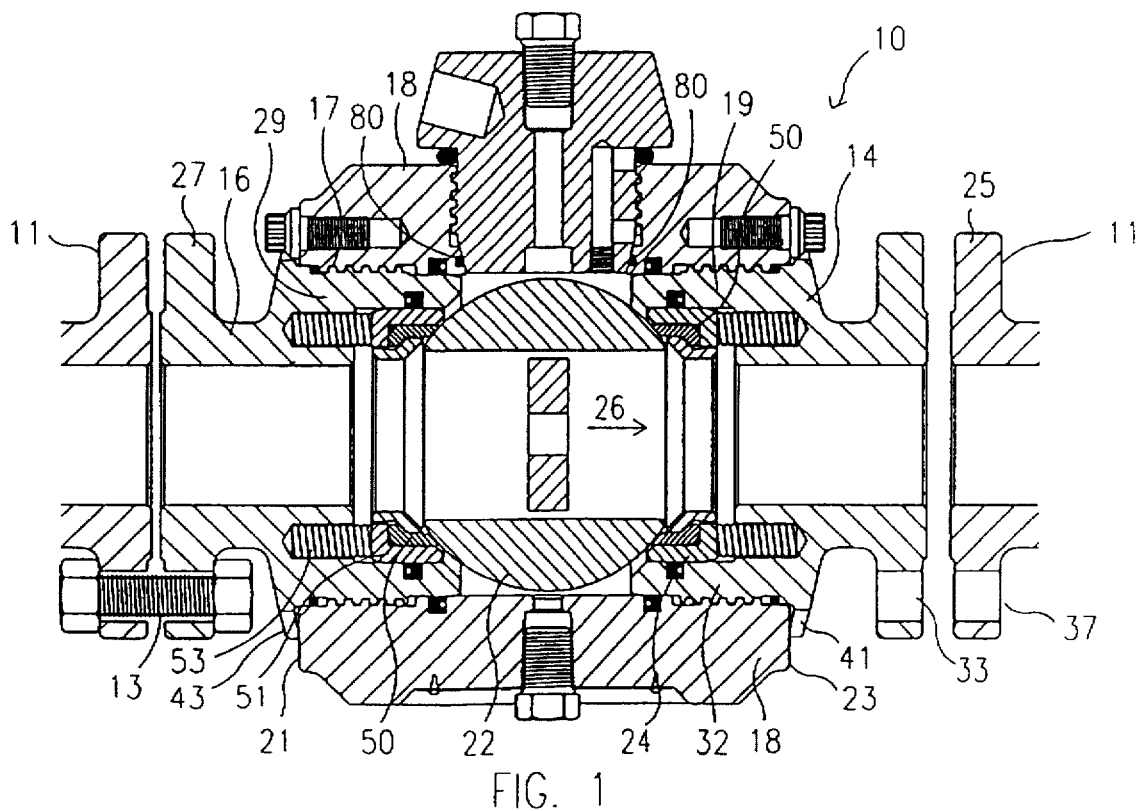
FIG. 1 shows a longitudinal section of a pig valve assembly with improved threaded joint according to the invention.

Referring to FIGS. 1 and 2, there is shown a pig injector valve with an improved threaded joint according to the invention. The pig injector is formed of a valve assembly 10 that attaches between portions of a pipe 11 in conventional fashion using studs 13. The valve assembly 10 is formed of a first tubular tail piece 14, a second tubular tail piece 16 and a center piece or housing 18 which is tubular and has an interior bore.

A valve ball 22 is disposed within the valve assembly 10 and seated on valve seats generally indicated at 24. The valve ball 22 has a bore 26 passing entirely through the valve ball.

Referring in particular to FIG. 2, there is shown means to rotate the valve ball 22 within the valve assembly 10 between a position in which the bore 26 is aligned along the pipe (as shown in FIG. 1) and a position in which the bore is aligned across the pipe. The means to rotate the valve ball 22 includes a stuffing box 28 fastened into the side of the pig injector using four ferry capscrews 30. The stuffing box 28 is sealed to the body center piece 18 using O-ring 31. A stem 34 is journalled within the stuffing box 28 on bearings 36, secured within the stuffing box by snap ring 38 and shoulder 41 and sealed using seals 42 and 44. The stem 24 is connected to the valve ball 22 by plate 46.

Each valve seat 24 is formed of an annular sealing element 50 (for example made of nylon or other relatively stiff plastic, such as Nylatron™, a nylon with molybdenum sulphide) riding on an L-shaped annular ring 51, which itself is supported by several springs 53 in valve tail piece 16.

On one side of the valve ball body 10 is a side entry cap 60 for injecting pigs into and receiving pigs from the pipeline to which the valve body is attached. The side entry cap 60 includes holes 61 into which a bar may be inserted for opening and closing the side entry cap 60. The side entry cap 60 is disposed in the valve assembly 10 in alignment with the bore 26 of the valve ball 22 when the bore 26 is aligned across the pipe (when rotated 90° from the position shown in FIG. 1). The side entry cap 60 is formed of a plug 62 having a cylindrical threaded portion 64 that threads into corresponding threads 66 on the valve assembly 10, and a conical sealing portion 68 inward of the threaded portion. By "inward", is meant closer to the valve axis or valve bore, such that the sealing portion 68 prevents exposure of the threads to the material passing through the valve. The sealing portion 68 has an exterior surface forming a conical section increasing in diameter with increasing distance from the bore of the valve ball 22. The valve assembly 10 has a corresponding conical cap seat 70 whose exterior surface is machined at the same conical angle as the conical section of the side entry cap 60. An annular groove 72 is formed in one of the conical cap seat 70 (FIG. 1) and the sealing portion 68 (not shown) respectively. The annular groove 72 is defined by walls 80 extending inward from the surface in which they are formed. In the case of annular groove 72, this is inward from the surface of the cap seat 70, and in the case of annular groove in the sealing portion 68, this is inward from the surface of the sealing portion 68. These walls 80 are preferably perpendicular to the axis B of the side entry cap 60, but a less preferred option is to have the side walls 80 perpendicular to the face of the conical section. An annular sealing element 76, which may be an O-ring made of Teflon™ (tetrafluoroethylene) or other plastic chemically inert material, is disposed within the annular groove 72 respectively in conventional sealing fashion.

The preferred conical angle of the sealing portion 68 and conical seat 70 to the side entry cap axis B is about 15°. This permits a good seal between the respective conical portions of the valve body center piece 18 and the side entry cap 60, without the plug 62 damaging the annular sealing element 76 as the plug 62 is threaded into the valve body 18.

Each tail piece 14, 16 forms a threaded flanged joint for connecting the pig valve 10 within the pipe 11. The housing 18 is tubular in the sense of having an internal bore, and is threaded at each end 17, 19 with interior threads. The housing 18 terminates outwardly of the threaded ends in shoulders 21, 23. Each tubular tail piece 14, 16, has a flanged end 25, 27 respectively, and a threaded end 29, 32 respectively with exterior threads. Each tail piece 14, 16 also includes a shoulder 41, 43 respectively formed on the outside of the tail pieces 14, 16 intermediate the threaded ends 29, 32 and the flanged ends 25, 27. The shoulders 41, 43 are preferably annular discs extending radially outward from the tail pieces and inclined towards the threaded ends of the tail pieces, such that they are substantially concave in the direction towards the threaded ends of the tail pieces. The exterior threads have a pitch W, for example 0.25 inches, that matches the interior threads of the housing 18 so that they may engage each other. Upon rotation in relation to the valve housing, the tail pieces 14, 16 move longitudinally in relation to the housing 18 until shoulder 21 abuts shoulder 43 and shoulder 23 abuts shoulder 41.

Each flange 25, 27 has a number (N, for example 8), of equally circumferentially spaced bolt holes 33. Together with corresponding bolt holes 37 of pipe 11, and studs 13, the bolt holes 33 form connectors for connecting the pig valve 10 to the pipe 11. Shoulders 41, 43, by virtue of being inclined annular discs are elastically deformable as the tail pieces are threaded onto the housing 18, and must be elastically deformable at least over a distance L=W/N, that is, they must permit rotation of the tail pieces 14, 16 after contact of the shoulders 43 and 21, and the shoulders 41 and 23 respectively, before further longitudinal motion is stopped by the shoulders, by an amount at least equal to the spacing between the bolt holes 33.

According to the invention, therefore, it may be ensured that a bolt hole in the flanges 25, 27 will align with a bolt hole 37, while maintaining a locking tension on the exterior threads of the tail pieces 14 and the interior threads of the housing 18.

Figure 3:
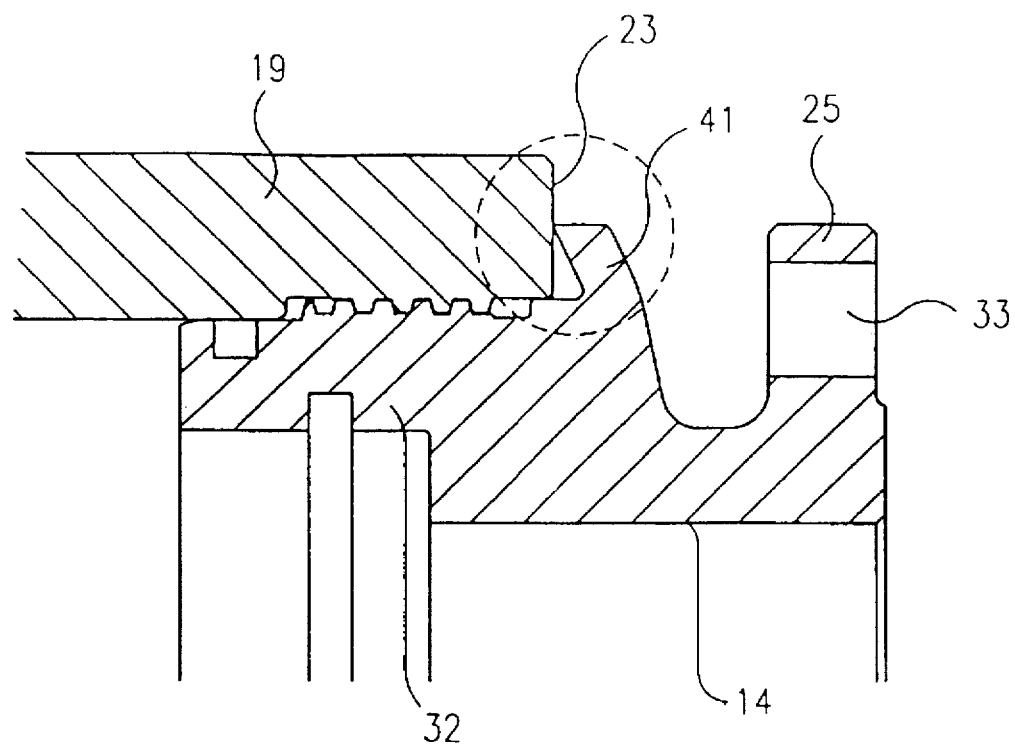
FIG. 3 is a detailed section through the threaded joint of FIG. 1 before tightening of the joint.
Figure 4:
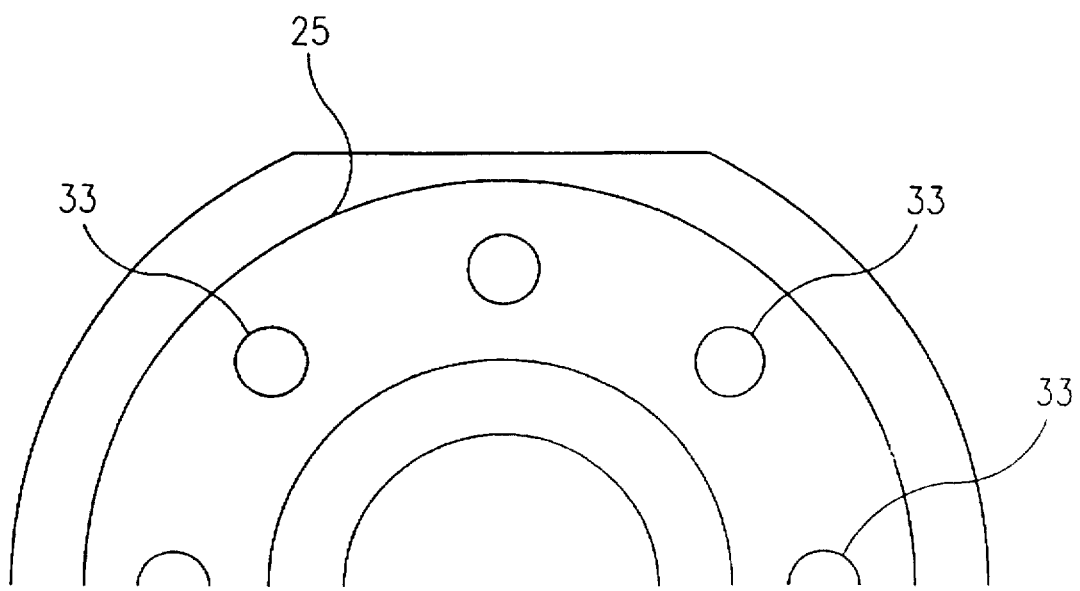
FIG. 4 is a view of one of the flanges of the pig valve assembly of FIG. 1 corresponding to the position shown in FIG. 3.
Figure 5:
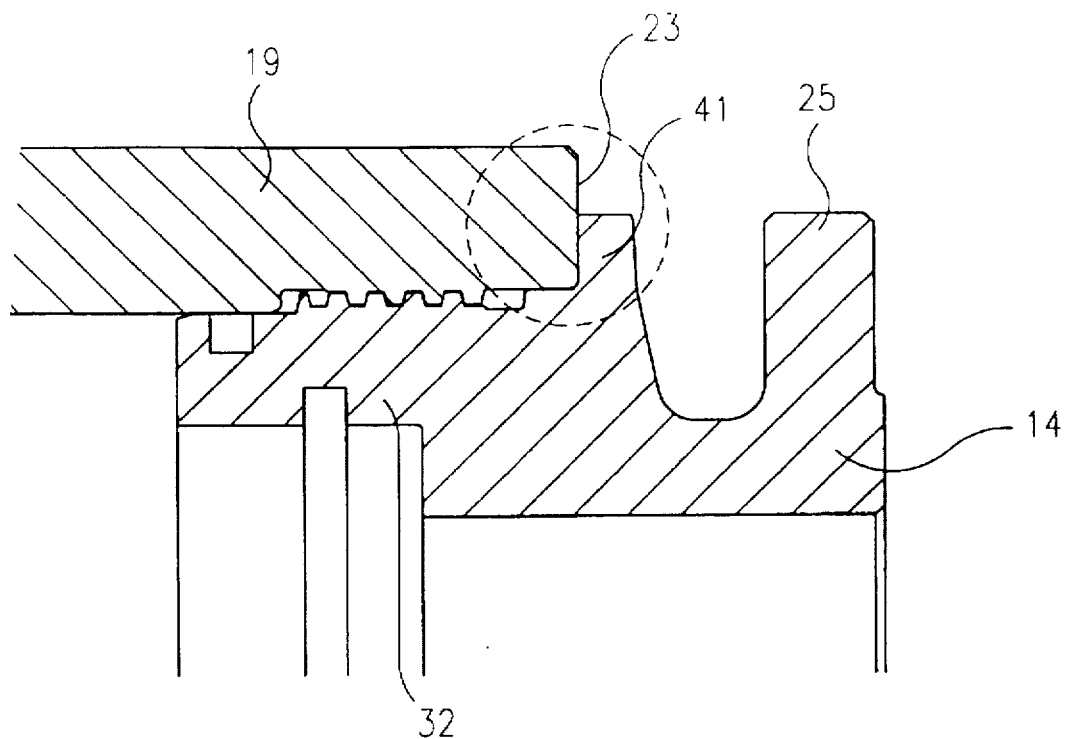
FIG. 5 is a detailed section through the threaded joint of FIG. 1 after tightening of the joint.
Figure 6:
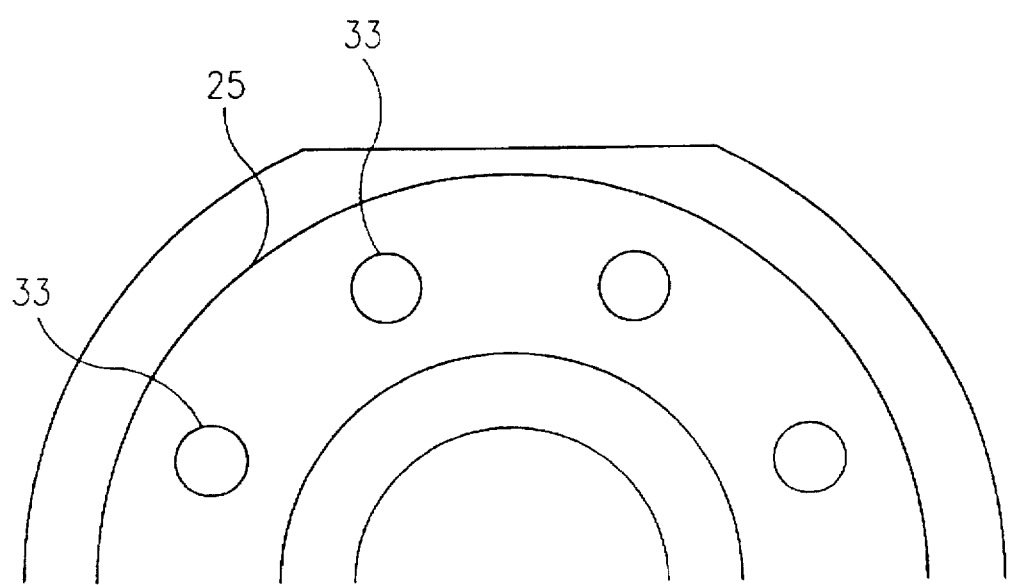
FIG. 6 is a view of the flange of FIG. 4 corresponding to the position shown in FIG. 5.

FIG. 3 shows the shoulder 41 after it has just been touched by shoulder 23, while FIG. 4 shows the corresponding bolt hole locations. FIG. 4 shows the shoulder 41 elastically deformed by shoulder 23, maintaining tension on the threads. The corresponding change in position of the bolt holes 33 due to the tail piece 14 rotating from the position shown in FIG. 3 to the position shown in FIG. 5 is shown in FIG. 6.

It is possible to make the shoulder 23 deformable, by undercutting the end 19 either from the outside or the inside, and the shoulder 41 may then be rigid. Possibly, both shoulders may be made deformable, or the shoulders 23 and 41 could be made essentially rigid with a deformable annular member encircling the threaded end 19 of the tail piece 14. In this last instance, wherein the deformable portion of the shoulder is not integral with the tail piece, this is considered to be included within the term "one of the shoulders including an elastically deformable portion" as defined by the claims.

To install the pig injector valve according to the invention, the tail pieces 14, 16 are threaded into the housing 18 until the shoulders 23, 41 and 21, 43 abut, and then further rotated until one of the bolt holes in the flanges 25, 27 align with the bolt holes in the pipe flanges.

A person skilled in the art could make immaterial modifications to the invention described and claimed in this patent without departing from the essence of the invention.

The embodiments of the invention in which an exclusive property or privilege is claimed are defined as follows:

1. An improved threaded joint, comprising:
    a first tubular member having a first threaded end with first threads, and a first shoulder on the first threaded end;
    a second tubular member having a flanged end and a second threaded end with second threads, and a second shoulder on the second threaded end;
    a flange at the flanged end having N equally circumferentially spaced connectors;
    the first and second threads having a pitch W, and being engageable with each other such that the first shoulder abuts the second shoulder; and
    one of the first shoulder and second shoulder including a portion that is elastically deformable over a distance at least equal to W/N.

2. The improved threaded joint of claim 1 in which:
    the first tubular member has exterior threads;
    the second tubular member has interior threads; and
    the second shoulder is located between the second threaded end and the flanged end.

3. The improved threaded joint of claim 2 in which the second shoulder includes an annular disc extending radially outward from the second tubular member and inclined towards the second threaded end.

4. The improved threaded joint of claim 1 in which the connectors are selected from the group consisting of bolts and bolt holes.

5. The improved threaded joint of claim 1 in which the elastically deformable portion of the first or second shoulder is integral with the respective one of the first or second shoulder.

6. A pig valve, in which the pig valve includes a housing, a ball valve seated in the housing, a first threaded flanged joint located on a first side of the housing, the threaded flanged joint comprising:

a first tubular member having a first threaded end with first threads, and a first shoulder on the first threaded end;

a second tubular member having a flanged end and a second threaded end with second threads, and a second shoulder on the second threaded end;

a flange at the flanged end having N equally circumferentially spaced connectors;

the first and second threads having a pitch W, and being engageable with each other such that the first shoulder abuts the second shoulder; and one of the first shoulder and second shoulder including a portion that is elastically deformable over a distance at least equal to W/N.

7. The improved threaded joint of claim 6 in which the elastically deformable portion of the first or second shoulder is integral with the respective one of the first or second shoulder.

8. The pig valve of claim 6 further including a second threaded flanged joint located on the pig valve opposed to the first threaded flanged joint, the second threaded flanged joint comprising:

a third tubular member having a third threaded end with third threads, and a third shoulder on the third threaded end;

a fourth tubular member having a flanged end and a fourth threaded end with fourth threads, and a fourth shoulder on the fourth threaded end;

a flange at the flanged end having N equally circumferentially spaced connectors;

the third and fourth threads having a pitch W, and being engageable with each other such that the third shoulder abuts the fourth shoulder; and one of the third shoulder and fourth shoulder being elastically deformable over a distance at least equal to W/N.

9. The pig valve of claim 8 in which:

the first tubular member has exterior threads;

the second tubular member has interior threads; and the second shoulder is located between the second threaded end and the flanged end.

10. The pig valve of claim 8 in which the second shoulder includes an annular disc extending radially outward from the second tubular member and inclined towards the second threaded end.

11. The pig valve of claim 6 further including a pig injector port in the pig valve.

12. A method of securing together (A) a flanged pipe having a terminal flange and N equally spaced tubing connectors, and (B) a first threaded tubular member, in which the first threaded tubular member has a first threaded end with threads and a first shoulder, using (C) a second tubular member having a second threaded end, a flanged end, and a second shoulder on the second tubular member, at least the flanged end including N equally circumferentially spaced connectors, threads on the first and second threaded ends having a pitch W, one of the first and second shoulders including a portion that is elastically deformable at least over a distance W/N, the method comprising the steps of:

threading the second threaded end onto the first threaded end until the first and second shoulders touch each other; and rotating the second tubular member until connectors on the flanged end align with connectors on the terminal flange.

13. A pig injector valve comprising:

a valve assembly having a pair of valve seats;

a valve ball disposed within the valve assembly and seated on the valve seats, the valve ball having a bore;

means to rotate the valve ball within the valve assembly between a position in which the bore is aligned along the pipe and a position in which the bore is aligned across the pipe;

a side entry cap disposed in the valve assembly in alignment with the bore of the valve ball when the bore is aligned across the pipe;

the side entry cap including a threaded portion and a sealing portion inward of the threaded portion, the threaded portion being cylindrical and the sealing portion having an exterior surface forming a conical section increasing in diameter with increasing distance from the bore of the valve ball;

the valve assembly having a corresponding conical seat portion for receiving the conical section of the side entry cap in sealing relationship;

an annular groove formed in one of the conical section of the sealing portion and the conical seat portion of the valve assembly inward of the threaded portion, the annular groove being defined by walls extending inward from the respective one of the conical section of the sealing portion and the conical seat portion of the valve assembly; and an annular sealing element disposed within the annular groove.

14. The pig injector valve of claim 13 in which the annular groove is formed in the sealing portion of the side entry cap.

15. The pig injector valve of claim 14 in which the side entry cap has a central axis and the side walls of the annular groove are perpendicular to the central axis.

\* \* \* \* \*